United States Patent [19]

Morioka et al.

[11] Patent Number: 4,848,215
[45] Date of Patent: Jul. 18, 1989

[54] APPARATUS FOR REMOVING SPRAY MIST FROM SPRAYING BOOTH

[75] Inventors: Koji Morioka, Amagasaki; Susumu Yoshida, Nara, both of Japan

[73] Assignee: Taikisha Ltd., Tokyo, Japan

[21] Appl. No.: 170,170

[22] Filed: Mar. 18, 1988

Related U.S. Application Data

[63] Continuation-in-part of Ser. No. 929,997, Nov. 12, 1986, abandoned, which is a continuation of Ser. No. 698,944, Feb. 7, 1985, abandoned.

[30] Foreign Application Priority Data

Feb. 13, 1984 [JP] Japan ................................ 25529

[51] Int. Cl.4 .................................................. B01B 15/12
[52] U.S. Cl. ...................................... 98/115.2; 55/241; 55/DIG. 46; 118/326
[58] Field of Search .................. 55/240, 241; 98/115.2; 118/326, DIG. 7; 261/62, 109, 112, DIG. 54

[56] References Cited

U.S. PATENT DOCUMENTS

| | | | |
|---|---|---|---|
| 2,267,426 | 12/1941 | Saunders et al. | 261/DIG. 54 |
| 3,795,093 | 3/1974 | Gerhard et al. | 55/238 |
| 4,257,784 | 3/1981 | Gerhard et al. | 55/84 |
| 4,299,602 | 11/1981 | Cordier et al. | 55/240 |
| 4,350,506 | 9/1982 | Otto | 55/241 |
| 4,440,554 | 4/1984 | Perry | 55/241 |

FOREIGN PATENT DOCUMENTS

| | | | |
|---|---|---|---|
| 720060 | 10/1965 | Canada | 118/326 |
| 2932392 | 2/1981 | Fed. Rep. of Germany | 118/326 |
| 1288388 | 4/1961 | France | 55/240 |
| 60-216862 | 10/1985 | Japan . | |
| 567980 | 3/1945 | United Kingdom . | |
| 669226 | 4/1952 | United Kingdom . | |
| 1170864 | 11/1969 | United Kingdom . | |
| 1218401 | 1/1971 | United Kingdom . | |
| 1389931 | 4/1975 | United Kingdom . | |
| 2017527 | 10/1979 | United Kingdom . | |
| 1566718 | 5/1980 | United Kingdom . | |
| 2110952 | 6/1983 | United Kingdom . | |
| 2120576 | 12/1983 | United Kingdom . | |

Primary Examiner—Harold Joyce
Attorney, Agent, or Firm—Webb, Burden, Ziesenheim & Webb

[57] ABSTRACT

An apparatus for removing spray mist from a spraying booth. The apparatus comprises an exhauster for forcibly discharging a mixture of air and a mist of superfluous paint from the spray booth, and a plurality of constricted flow passages arranged in an exhaust route extending from the spraying booth to the exhaust for causing the air/mist mixture to strike against purifying water. This mist removing mechanism utilizing a difference in inertial mass between the air and the spray mist at times of passing through the constricted flow passages, whereby the spray mist is trapped in the purifying water upon collision therebetween.

2 Claims, 4 Drawing Sheets

APPARATUS FOR REMOVING SPRAY MIST FROM SPRAYING BOOTH

BACKGROUND OF THE INVENTION

This application is a continuation-in-part of application Ser. No. 929,997, filed Nov. 12, 1986, now abandoned which was a continuation of application Ser. No. 698,944, filed Feb. 7, 1985, now abandoned.

This invention relates to an apparatus for removing spray mist from a spraying booth, and more particularly to an apparatus comprising an exhauster for forcibly discharging a mixture of air and a mist of superfluous paint from the spraying booth, and one or more constricted flow passages in an exhaust route extending from the spraying booth to the exhauster for causing the air/mist mixture to strike against purifying water. This mist removing mechanism utilizes a difference in inertial mass between the air and the spray mist at times of passing through the constricted flow passages, whereby the spray mist is trapped in the purifying water upon collision therebetween.

Known spray mist removing apparatus are constructed as shown in FIGS. 4 and 5 of the accompanying drawings. Referring first to FIG. 4, an example of the known apparatus comprises one or more constricted flow passages 8' disposed in an exhaust route R and including an outlet opening 8a' defining a downwardly directed straight flow path opposed to a surface of purifying water w1 in a water vessel 9. An exhaust gas or mixture of air and spray mist shooting out of the outlet opening 8a' at high velocity strikes against the surface of purifying water w1, whereupon the spray mist contained in the gas is trapped in the purifying water in the water vessel 9. On the other hand, the apparatus shown in FIG. 5 comprises one or more constricted flow passages 11' defining a winding flow path for permitting purifying water w2 to flow downwardly together with the exhaust gas. Centrifugal forces resulting from the winding downward flows of the water/gas mixture cause the gas strike against the downwardly flowing water w2, whereupon the spray mist contained in the gas is trapped in the water w2.

In the first example of apparatus, the constricted flow passage 8' directed straight downward hardly becomes clogged by the spray mist or aggregates of paint adhering to inner walls of the passage. Therefore this apparatus assures a steady mist removing performance and has an advantage from the point of view of maintenance. Its intrinsic shortcoming is that small spray mist particles not exceeding, for example, 5 μm in diameter cannot be removed efficiently.

The second example has the advantage that small spray mist particles are removed with high efficiency by causing the exhaust gas to flow through the constricted flow passage or passages at suitable high velocity. However, the centrifugal forces resulting from the winding flows of the exhaust gas act heavily on large spray mist particles, in particular when the exhaust gas flows through the winding path or paths at high velocity. The large spray mist particles tend to penetrate films of the downwardly flowing purifying water, strike against inner walls of the passage, and adhere to the inner walls. Moreover, because of the winding shape of the passage 11' downwardly flowing aggregates of paint tend to get caught in intermediate parts of the passage, which necessitates frequent maintenance operations.

SUMMARY OF THE INVENTION

This invention has for an object to provide a spray mist removing apparatus which will remove both large spray mist particles and small spray mist particles with high efficiency and without requiring frequent maintenance operations.

The apparatus includes an exhaust route and a means for forcibly discharging a mixture of air and a mist of superfluous paint from a spraying booth, through a floor of the spraying booth including exhaust openings each having a width approximating that of the object undergoing a spraying operation, and into purifying water in a plurality of water vessels and through a plurality of constricted flow passages in the exhaust route. A first water vessel is disposed beneath the spraying booth and one or more straight constricted flow passages extend perpendicularly and downwardly from the first water vessel and direct flows into a second water vessel disposed immediately beneath the outlet openings of the straight constricted flow passages. The outlet openings of the straight flow passages each have a large radius and the second water vessel has an open face larger than the outlet openings.

The apparatus also includes a third water vessel located downstream of and separate from the second water vessel. One or more curved constricted flow passages, utilizing a centrifugal force effect, extend downwardly from the third water vessel and pass therealong overflowing water from the third water vessel. The curved flow passages include a pair of laterally directed winding flow passages, each having a convex face relative to the incoming overflowing water. The two winding flow passages are opposed to each other and guide the water to collide with the respective convex faces. A fourth water vessel is disposed beneath and receives flows from the curved constricted flow passages.

The invention takes into account the intrinsic characteristics of the constricted flow passage directed straight downward and the constricted winding flow passage, respectively. More particularly, the constricted flow passage or passages directed straight downward and located in an upstream position along the exhaust route are used to remove large spray mist particles and aggregates of paint, and the constricted winding flow passage or passages located in a downstream position along the exhaust route are used to remove only the small spray mist particles that remain in the exhaust gas having passed the flow passage or passages located upstream.

Therefore, the constricted winding flow passage or passages are effectively protected from clogging due to the large spray mist particles and aggregates of paint adhering to inner walls thereof. This significantly reduces the frequency of maintenance operations for the constricted winding flow passages which, together with the intrinsic nature of requiring no maintenance of the constricted flow passages directed straight downward, greatly facilitates maintenance of the entire spray mist removing apparatus. Accordingly, the spray mist removing apparatus of this invention has a very high utility, being capable of efficiently removing the spray mist regardless of its particle size.

Other objects and advantages of this invention will be apparent from the following description.

DESCRIPTION OF THE PREFERRED EMBODIMENTS

Embodiments of this invention will be described with reference to the drawings.

Figure 1A:
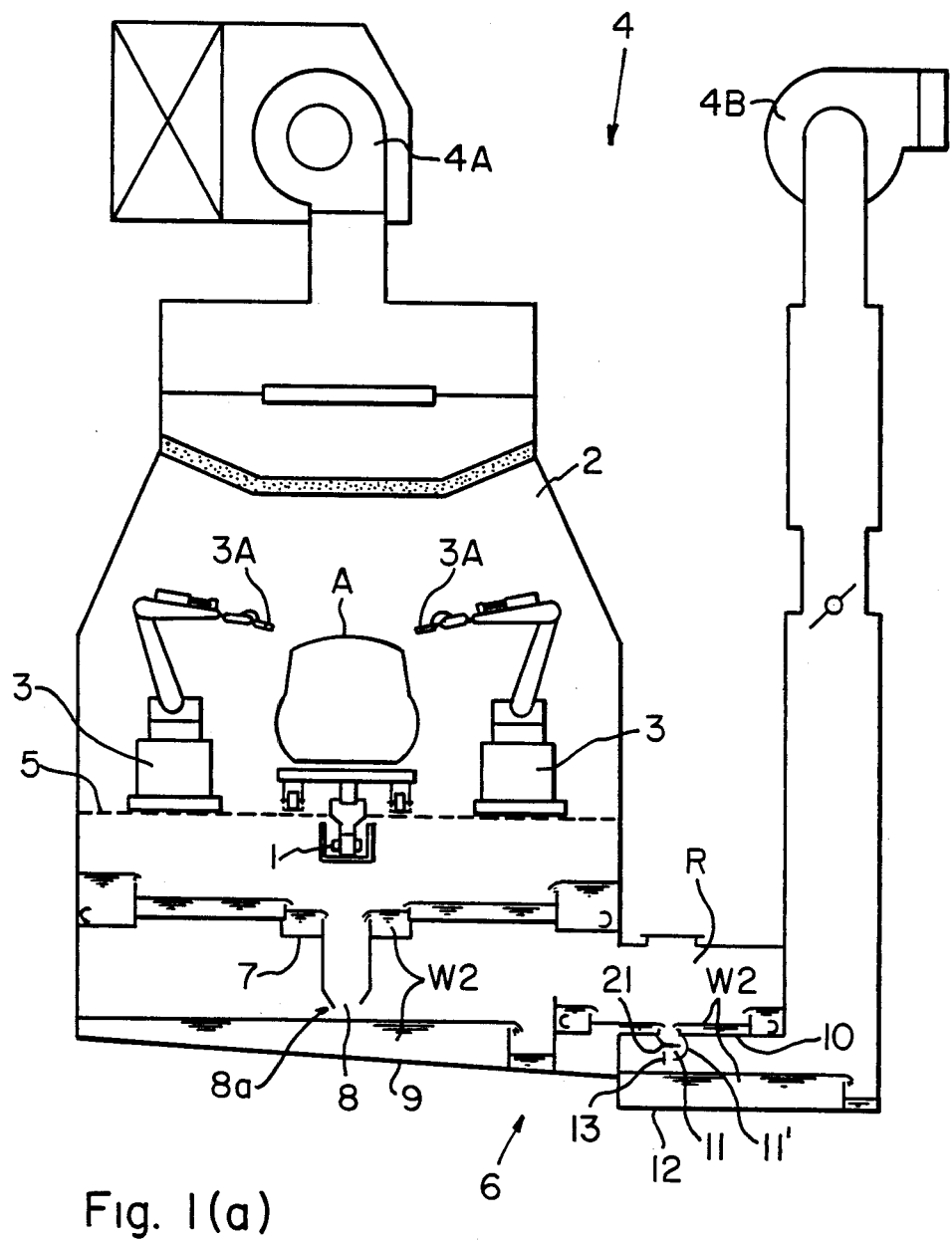
FIG. 1(a) is a view in vertical section of an embodiment of this invention.

As shown in FIG. 1(a), a conveyor 1 is provided to bring objects A in and out of a spraying booth 2 housing articulated robots 3 each carrying a spray gun 3A for automatically spraying paint on the objects A. The spraying booth 2 is provided with a ventilating system 4 for removing a mist of superfluous paint from the booth 2. The ventilating system 4 comprises a feed fan 4A for feeding fresh air downwardly into the spraying booth 2 through a filter and substantially through an entire ceiling area of the booth 2, and an exhaust fan 4B for forcibly drawing a mixture of air and spray mist from the spraying booth 2 through a grating floor 5. As seen, a spray mist removing apparatus 6 is provided in an exhaust route R extending from the spraying booth 2 to the exhaust fan 4B.

The spray mist removing apparatus 6 will be described in detail hereinafter. A first purifying water vessel 7 is disposed below the floor 5 to receive the mixture of air and spray mist or exhaust gas from the spraying booth 2. First cylindrical constricted flow passages 8 extend straight downwardly from the first purifying vessel 7 in parallel to one another with respect to the exhaust route R. Each of the first flow passages 8 includes an outlet opening 8a opposed to a surface of water in a second purifying water vessel 9 disposed therebelow. Thus the first flow passages 8 cause the exhaust gas to pass therethrough at high velocity together with water overflowing from the first purifying water vessel 7 and flowing down inner walls of the first flow passages 8. This arrangement utilizes a difference in inertial mass between the air and the spray mist contained therein during passage through the first constricted flow passages 8 at high velocity, whereby the spray mist is trapped in the purifying water W1 in the second purifying water vessel 9 and separated from the air when the exhaust gas shooting from the first flow passages 8 strikes against the surface of the purifying water W1.

It will be understood that the water W1 overflowing from the first purifying water vessel 7 and flowing down the inner walls of the flow passages 8 serves the purposes of smoothening the flow of aggregates of paint down the passages 8 and preventing the spray mist from adhering to the inner walls of the passages 8.

The spray mist removing apparatus 6 further comprises a third purifying water vessel 10 disposed in the exhaust route R downstream of the first flow passage 8 to receive the exhaust gas partially purified from the spray mist in the preceding stage by the first constricted flow passages 8. Second constricted flow passages 11 extend downwardly in a shape similar to the letter S to permit the exhaust gas and water W2 overflowing from the third purifying water vessel 10 to flow down confluently at high velocity. Centrifugal forces resulting from the high velocity winding flows through the second constricted passages 11 cause the exhaust gas to collide with the purifying water W2 flowing down confluently therewith, whereby small spray mist particles remaining in the exhaust gas without being removed therefrom by the function of the first flow passages 8 are trapped in the downflowing purifying water W2 by virtue of the difference in inertial mass as in the preceding stage.

The curved constricted flow passages 11 are formed of a pair of laterally directed winding flow passages 11 and 21 each having a concave face relative to the incoming overflowing water from the third water vessel 10. The winding flow passages 11 and 21 are opposed to each other and guide the water to collide with the respective concave faces. In this manner, the centrifugal effect associated with the curved flow of the water is efficiently utilized.

Reference number 12 in the drawing indicates a fourth purifying water vessel for receiving the flows from the second constricted flow passages 11. Number 13 indicates an impact plate or plates for facilitating trapping of the spray mist by the downflowing purifying water W2, and for this purpose the impact plate or plates 13 are arranged to be struck by the gas/water mixture shooting out of the second constricted flow passages 11 at high velocity.

Figure 3:
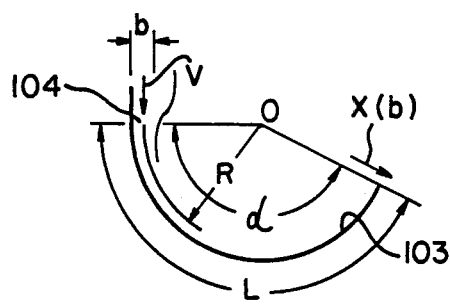
FIG. 3 is a theoretical illustration concerning a second constricted flow passage.

The function of the second constricted flow passages 11 is considered in regard of inertia separation as far as Stokes' law of separation is applicable, with reference to FIG. 3. In this figure, number 103 indicates a concave guide surface for the purifying water and the exhaust gas containing the spray mist, number 104 indicates an inlet to the guide surface, reference 0 indicates the center of curvature of the guide surface 103, $\alpha$ indicates an effective angle in radians thereof, R' an effective radius derived by subtracting ½ of the transverse dimension b of the inlet 104 from the radius of curvature of the guide surface, and v indicates gas flow velocity at the inlet 104. Disregarding reduction of the gas flow velocity for primary approximation and supposing R'>b, the distance X(d) by which particles of the spray mist move radially outwardly by centrifugal forces within the angle $\alpha$ is derived from the following equation:

$$X(d) = \frac{\alpha(\rho p / - 1)v}{18\alpha} \cdot d^2$$

Wherein d is particle diameter (m),
$\rho$ p is particle density (kg/m$^3$),
$\rho$ is gas density (kg/m$^3$), and
$\rho$ kinetic viscosity coefficient of gas (m$^2$/sec.).

Thus, where X(dc)=b, in which dc is a critical diameter for trapping, particles whose diameters d are greater than dc get trapped in the water and those whose diameters d are smaller than dc remain in the gas. In other words, the smaller the diameter, the more difficult is the particle to trap.

Accordingly, the second constricted flow passages 11 in the foregoing embodiment have a large effective angle in radians, that is to say a large circumferential length L, in order to diminish the critical diameter for trapping. The second constricted flow passages 11 arranged as such are effective to remove the small spray mist particles that remain in the gas after passing through the preceding stage.

As seen from FIG. 1a, the second constricted flow passages 11 are defined by plate members 11' and 21 each having substantially semicircular cross sections.

To summarize the foregoing description, this invention provides the winding second constricted flow passages 11 which are highly efficient in removing small spray mist particles but tend to be clogged by large spray mist particles and aggregates of paint adhering to the inner walls thereof, downstream of the straight downwardly directed first constricted flow passages 8 which are less efficient in removing the small spray mist particles but require less maintenance work. This positional arrangement permits the entire mist removing apparatus to remove the spray mist regardless of its particle size with high efficiency, and improves the entire apparatus from the point of view of maintenance by effectively preventing clogging of the second constricted passages 11.

Figure 1B:
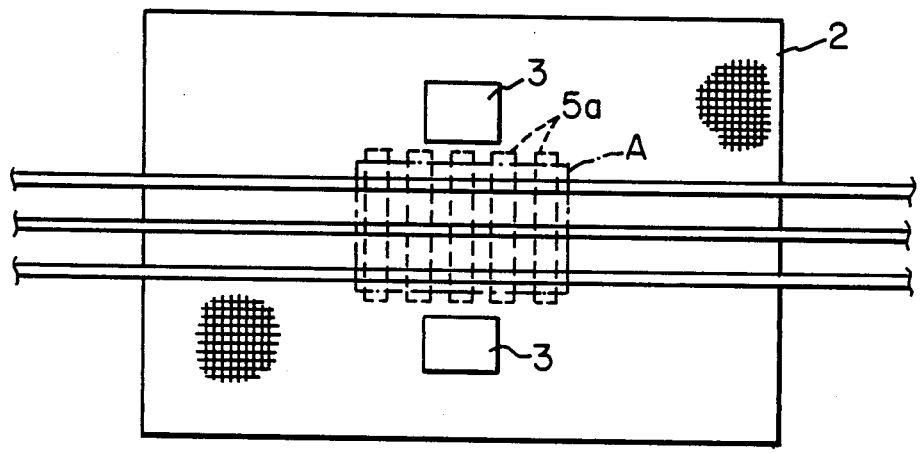
FIG. 1(b) is a plan view of a portion of the embodiment shown in FIG. 1(a)

As shown in FIG. 1(b), the exhaust openings in the floor 5 of the spraying booth 2 are formed as a plurality of slits 5a having a width approximating or extending across the width of the object A to be painted by the articulated robots 3. The slits 5a may be formed as lateral or longitudinal slits, provided they extend across the width of the object being painted. It has been found that such exhaust openings are particularly effective for efficiently guiding the paint mist into the first straight constricted flow passages 8 and then causing the same to collide with the second water vessel 9 therebeneath. More specifically, the dimension, especially the width of the exhaust openings, should be neither too large nor too small to obtain effective air flow. With the above defined specific width of the exhaust openings, it is possible to form air flow having less disturbances and uni-directional orientation which may effectively and reliably trap the spray mist at the second water vessel 9. In this case, mists having relatively large particle diameter are reliably and with high efficiency trapped at the second water vessel 9. The width of the object to be painted A is typically constant in the same painting line. However, if the exhaust openings are formed as slits as shown in FIG. 1(b), the opening width may be readily adjusted to possible variations in the width of the object by partially covering the ends of the exhaust openings.

Figure 2:
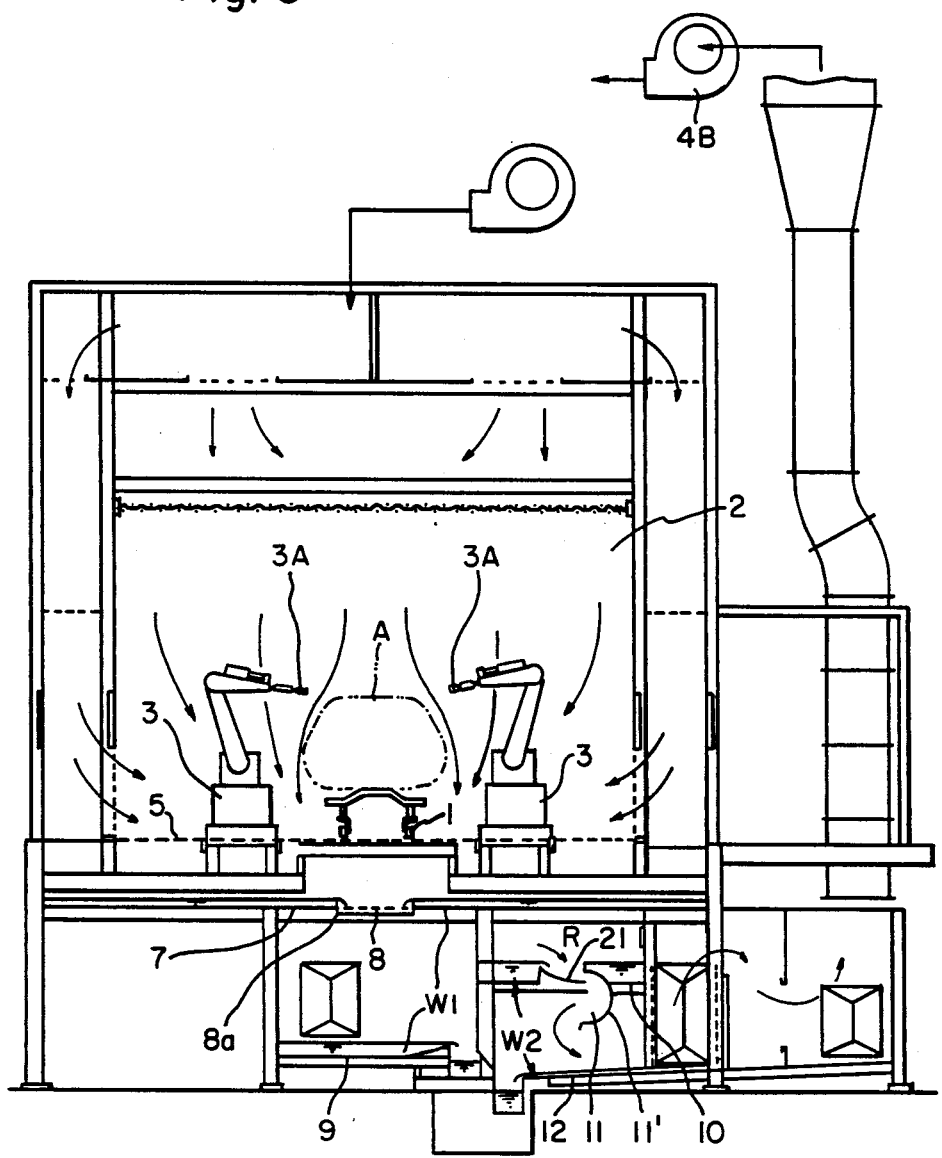
FIG. 2 is a view in vertical section of a modified embodiment of this invention.
Figure 4:
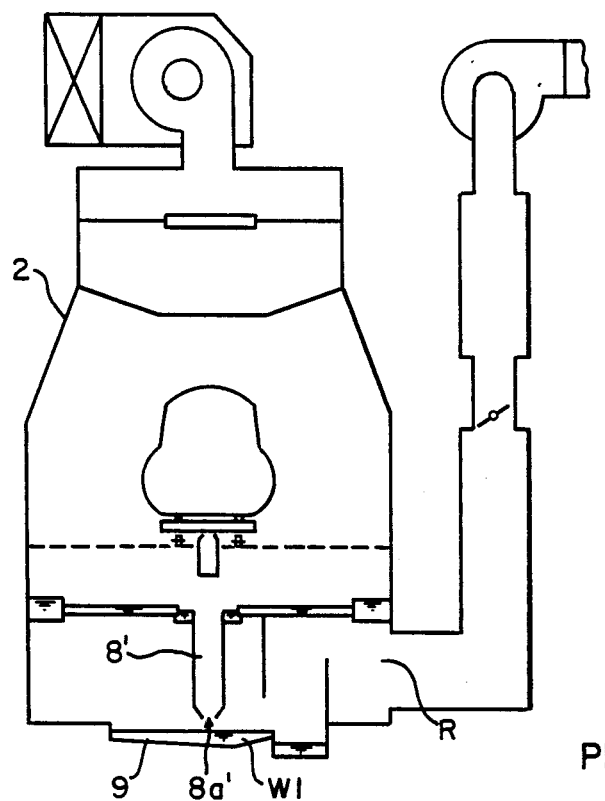
FIGS. 4 and 5 are vertical sectional views each showing a prior art construction.
Figure 5:
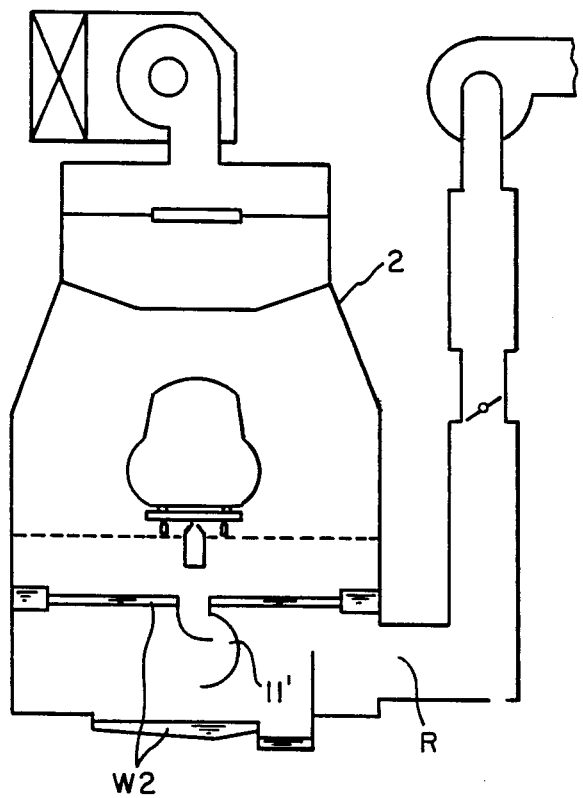

FIG. 2 shows a modified embodiment which differs from the first embodiment in that the first constricted flow passages 8 are extremely short. The first constricted flow passages 8 as shown include slit-shaped inlets, respectively, defined in the floor of the booth and arranged along a conveying path for the objects A under painting treatment. The other components are the same as in the first embodiment, and are therefore affixed with like reference numbers with explanation thereof omitted.

Various other modifications may be made to the construction of the first constricted flow passages 8 located in an upstream party of the exhaust route R so long as the output openings 8a thereof define flow paths directed straight downward against the surface of purifying water in the water vessel 9.

Various modifications may be made also to the second constricted flow passages 11 located in the exhaust route R downstream of the first constricted flow passages 8 so long as winding flow paths are defined thereby to permit the exhaust gas and the purifying water to flow confluently downward.

The spray mist removing apparatus of this invention is applicable to various types of spraying booths.

We claim:

1. An apparatus for removing spray mist from a spraying booth, comprising:
   an exhaust route;
   means for forcibly discharging a mixture of air and a mist of superfluous paint from the spraying booth from a floor of the spraying booth including exhaust openings each having a width approximating that of an object undergoing a spraying operation into purifying water in a plurality of water vessels and through a plurality of constricted flow passages in said exhaust route;
   a first water vessel disposed beneath said spraying booth;
   one or more straight constricted flow passages extending perpendicularly and downwardly from said first water vessel, each of said straight constricted flow passages including an outlet opening having a large radius;
   a second water vessel disposed immediately beneath the output openings of said straight constricted flow passages and having an open face larger than the outlet openings for receiving the flow therefrom;
   a third water vessel located downstream of and separate from said second water vessel;
   one or more curved constricted flow passages utilizing a centrifugal force effect and extending downwardly from said third water vessel thereby flowing down an overflowing water from said third water vessel, said curved constricted flow passages including a pair of laterally directed winding flow passages each having a concave face relative to incoming overflowing water, said two winding flow passages being opposed to each other to guide the water to collide with the respective concave faces; and
   a fourth water vessel disposed beneath said curved constricted flow passages and adapted to receive flows therefrom.

2. Apparatus of claim 1 wherein the curved constricted flow passages are each defined by a plate member having a substantially semicircular sectional shape.

* * * * *